Jan. 30, 1951 W. ENGLER 2,539,994
DEVICE FOR BRAKING MOTOR VEHICLES
Filed May 12, 1948
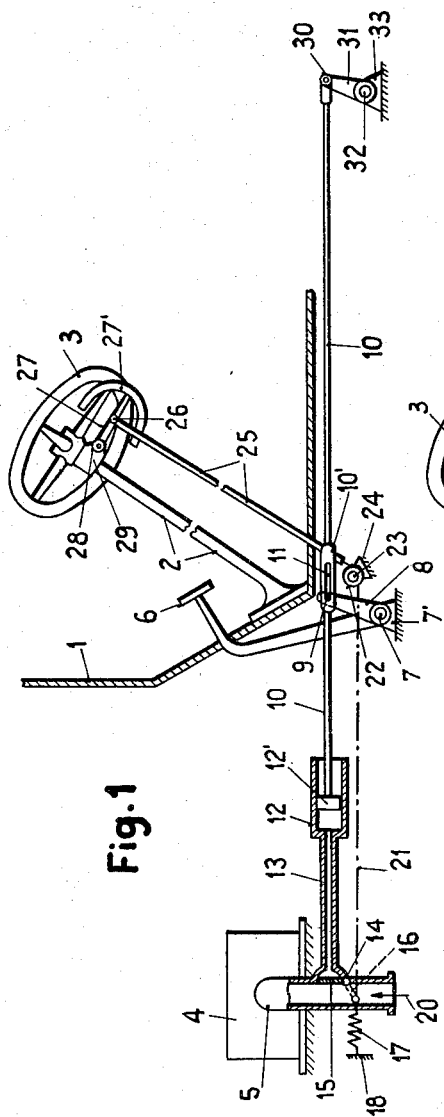
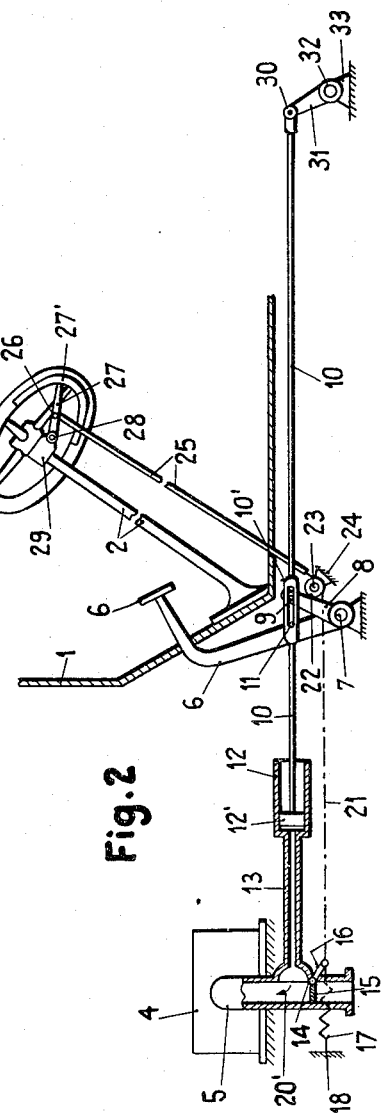
Inventor
Werner Engler Patented Jan. 30, 1951

2,539,994

UNITED STATES PATENT OFFICE 2,539,994

DEVICE FOR BRAKING MOTOR VEHICLES

Werner Engler, Kusnacht, Switzerland

Application May 12, 1948, Serial No. 26,577
In Switzerland May 14, 1947

1 Claim. (Cl. 74—431)

As brakes for motor vehicles the pedal brake and the hand lever brake are well-known. The hand lever brake is unpractical and not strong enough to be used as a stopping brake. It serves only for parking. The foot lever brake—i. e. the pedal—is effective for stopping on the road. It has, however, the drawback that it must be operated with the same foot as the gas lever, so that in order to brake the car, the foot must be removed from the gas lever and pressed on to the brake lever. According to the quickness of reaction of the driver, this takes place quicker or slower. It may also happen that a startled driver will not bring his foot from the gas lever to the brake lever, but continues to press the gas lever further down. Now every driver of a motor car knows that it always requires some self-control to remove the foot from the gas lever and to press down the brake lever at a street crossing or some other impediment. One waits, so to say, until the last moment and often there is then no longer time to remove the foot from the gas lever and to press the brake lever in order to prevent an accident.

It is also known that most drivers when they are surprised by an obstacle, instinctively clasp the steering-wheel firmly and almost convulsively, this instinctive action consequently taking place considerably quicker than the change of foot from the gas to the brake pedal, especially if the reflex motions which are well-known and peculiar to the driver have not yet acted, or if the capability of reaction is not quick. To sum up, it may be stated that the pedal is the most effective brake hitherto adopted, but in an emergency it requires too much time and does not respond to the inertia of the driver and his instinctive actions when suddenly startled.

The present invention is intended to remove these drawbacks. It may be described as a fright-brake, since it is most effective when the driver is suddenly frightened and instinctively clasps the steering-wheel firmly with his hands. This device for operating a motor car brake is characterised by a brake being provided additionally to at least one other braking device, the former being brought into action by an operating member provided on the steering member. Preferably this operating member is applied beneath the steering wheel. It is movable and can be operated without the hand leaving the steering-wheel, and in fact at any position on the steering-wheel circumference.

In the accompanying drawing one example of execution of the object of the invention is illustrated:

Figure 1 shows the device in semi-diagrammatic form in conjunction with a mechanical brake, in the position of rest, and Figure 2 the same in the braking position.

1 is the dashboard of the car, on which the tube 2 is fixed, in which the steering-wheel 3 is carried swivelling. 4 is the engine with the air suction pipe 5, from which a branch pipe 13 leads to the brake cylinder 12. 12' is the piston, from which a rod 10 leads through the joint 30 to the brake-operating lever 31. This lever is pivotably carried in the support 33 by means of the pin 32. At 10' the rod 10 is wider and provided with a longitudinal slot 11. 6 is the brake pedal which is pivotably carried in the support 7' by means of the bolt 7. On the same bolt a lever 8 is fixed which is directed upwards and provided at the upper end with a pin 9, projecting into the longitudinal slot 11 in the bar part 10'. At the crossing of the pipes 5 and 13 at 14, a valve 15 is hinged. On the hinge axis of this valve (behind the pipe 5) a lever 16 is fixed from whose end a pulling means 21 (for instance a cable) leads, over a rotatable roller 22 carried on the axle 23 of the support 24, to the lower end of a rod 25. The upper end of this rod is linked at 26 to a lever 27, 27', which is vertically movable linked at 28 to a sleeve 29 on the tube 2. The end of the lever 16 is connected to the fixed point 18 by means of a tension spring 17.

The method of working of the device is as follows:

In the position of rest of the brake the part 27' of the lever 27, 27' is at a certain distance below the steering-wheel 3 (see Figure 1). The cable 21 is kept taut by the spring 17, and the valve 15 closes the lefthand end of the pipe 13. The engine 4 draws air from atmosphere through the pipe 5 in the direction of the arrow 20. If braking has now to be quickly performed, the lever segment 27' is drawn upwards towards the steering-wheel 3 (with the fingers, without the hand leaving the steering-wheel). In this way, by means of the rod 25 and the pulling member 21 overcoming the force of the spring 17, the position of the valve 15 (see Figure 2) is changed in such a way that it closes the pipe 5 below the position where the pipe 13 branches off. In this way the engine draws air from the cylinder 12. The piston 12' with the rod 10 moves to the left (without the lever 8 or the brake pedal being moved), so that also the brake lever 31 swings over to the left and thereby operates the motor car brake. With a four-wheel brake four such levers 31 are provided, all of which are mechanically coupled to the rod 10. When the segment 27' is let loose, the brakes become free again.

With the described invention, braking takes place as quickly as possible, since actually only the fingers of one hand on the steering-wheel must be moved, without any great exertion of force. A movement of the fingers takes place through an impulse from the brain much quicker than a double movement of the foot, so that braking time is reduced to a minimum.

Naturally the device according to the invention may be combined with any braking system of a motor car.

With an hydraulic brake the hydraulic brake cylinder would be operated by the device.

Instead of lever, cable and spring, an electric device with known elements may be fitted for operating the air valve. Further, the brake rods, instead of being operated with servo-motor and vacuum, may be operated magnetically with the help of the battery, or by hydraulic means which also received its force from the battery.

What I wish to secure by U. S. Patent is:

The combination of a motor vehicle provided with a steering wheel and an internal combustion engine having its intake manifold connected with an air intake pipe and a foot pedal operated brake, of means operating said brake independently of the foot pedal, said means including a cylinder connected at one end with a portion intermediate the ends of said intake pipe, a manually operable valve flap hingedly connected to said air intake pipe for selectively closing said cylinder or closing said air intake pipe and connecting said cylinder with said intake manifold, spring means for normally holding said valve in a position in which said cylinder is disconnected from said air intake pipe and in which the latter is connected with the atmospheric air, a piston reciprocatively mounted in said cylinder and operatively connected with said brake, and a manually operable lever pivotally mounted on the steering column directly below said steering wheel, said lever being actuatable by the hands of the operator holding the steering wheel for moving said valve against the action of said spring means to a position in which said air intake pipe is connected with said cylinder and is disconnected from the atmospheric air, whereby the engine, when working, causes said piston to move in said cylinder in a direction in which the brake is applied to slow down and stop the vehicle.

WERNER ENGLER.

REFERENCES CITED

The following references are of record in the file of this patent:

UNITED STATES PATENTS

| Number | Name | Date |
|---|---|---|
| 1,502,111 | Molyneux | July 22, 1924 |
| 1,939,221 | Nelson | Dec. 12, 1933 |
| 2,212,904 | Stone | Aug. 27, 1940 |
| 2,316,396 | Breese | Apr. 13, 1943 |
| 2,325,771 | Hemphill | Aug. 3, 1943 |